(12) United States Patent
Rahman

(10) Patent No.: US 10,356,601 B1
(45) Date of Patent: *Jul. 16, 2019

(54) COMMUNICATING MOBILITY EVENTS IN AN IMS NETWORK ENVIRONMENT

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/248,722

(22) Filed: Jan. 15, 2019

Related U.S. Application Data

(63) Continuation of application No. 15/866,383, filed on Jan. 9, 2018, now Pat. No. 10,219,144.

(51) Int. Cl.
| | |
|---|---|
| *H04W 8/12* | (2009.01) |
| *H04W 8/26* | (2009.01) |
| *H04W 36/00* | (2009.01) |
| *H04L 1/06* | (2006.01) |
| *H04B 7/06* | (2006.01) |
| *H04L 1/04* | (2006.01) |

(Continued)

(52) U.S. Cl.
CPC ............ *H04W 8/12* (2013.01); *H04B 7/0613* (2013.01); *H04B 7/0617* (2013.01); *H04B 7/0697* (2013.01); *H04L 1/04* (2013.01); *H04L 1/06* (2013.01); *H04L 5/00* (2013.01); *H04W 8/26* (2013.01); *H04W 36/0016* (2013.01); *H04L 65/1016* (2013.01); *H04W 88/16* (2013.01)

(58) Field of Classification Search
CPC ... H04L 65/1016; H04L 65/1006; H04L 1/06; H04L 1/04; H04L 1/20; H04L 5/00; H04L 5/0003; H04W 8/06; H04W 8/08; H04W 8/26; H04W 8/04; H04W 8/18; H04M 3/2218; H04M 15/57; H04M 15/8038; H04M 2215/208; H04M 15/56; H04B 7/0617; H04B 7/0613; H04B 7/0619; H04B 7/0626; H04B 7/0697
USPC .......................................... 455/414.1, 432.1
See application file for complete search history.

(56) References Cited

U.S. PATENT DOCUMENTS

| | | |
|---|---|---|
| 7,397,909 B1 | 7/2008 | Campbell |
| 10,219,144 B1 | 2/2019 | Rahman |

(Continued)

*Primary Examiner* — Fred A Casca
(74) *Attorney, Agent, or Firm* — Perkins Coie LLP

(57) ABSTRACT

A system for communicating to an Internet Protocol Multimedia Subsystem (IMS) network mobility events occurring in a telecommunications access network. A mobile device connects to a first base station and registers on an IMS network. A component in the IMS network, such as a telephone application server (TAS), stores the first identifier. In addition, the TAS creates or modifies a call detail record (CDR) to indicate that the mobile phone is connected to the base station. After a handover occurs from the first base station to a second base station, the mobile device transmits to the IMS network a second identifier that identifies the second base station. The mobile device transmits the identifier of the second base station to the TAS within the IMS network via an XCAP PUT or POST request. After receiving the second identifier, the TAS stores the identifier and modifies a CDR to reflect the identifier.

20 Claims, 3 Drawing Sheets

(51) Int. Cl.
  *H04L 5/00*    (2006.01)
  *H04L 29/06*   (2006.01)
  *H04W 88/16*   (2009.01)

(56) References Cited

U.S. PATENT DOCUMENTS

2006/0268902 A1     11/2006  Bonner
2013/0142084 A1      6/2013  Tokunaga
2014/0370900 A1     12/2014  Byun et al.
2016/0021637 A1 *    1/2016  Cao .................... H04W 64/006
                                                         455/440
2016/0142447 A1 *    5/2016  Mufti ................. H04L 65/1046
                                                         370/260
2017/0287009 A1 *   10/2017  Austin ............... G06Q 30/0267

* cited by examiner

COMMUNICATING MOBILITY EVENTS IN AN IMS NETWORK ENVIRONMENT

CROSS-REFERENCES TO RELATED APPLICATIONS

This application is a continuation application of U.S. patent application Ser. No. 15/866,383, filed on Jan. 9, 2018, now U.S. Pat. No. 10,219,144, and entitled "COMMUNICATING MOBILITY EVENTS IN AN IMS NETWORK ENVIRONMENT," which is hereby incorporated herein in its entirety by reference.

BACKGROUND

The Internet Protocol Multimedia Subsystem ("IMS") is an architectural framework for delivering Internet Protocol ("IP") multimedia to mobile users, such as users of smart phones or tablet computers. An IMS core network ("IMS core") permits wireless and wireline devices to access multimedia, messaging, and voice applications and services. IMS standards and specifications have been promulgated by the 3rd Generation Partnership Project ("3GPP"™). To allow the IMS core to be integrated with Internet resources, the 3GPP specifications use Internet Engineering Task Force protocols within the IMS core, such as Session Initiation Protocol ("SIP") and Diameter. SIP is a signaling protocol used for creating, modifying and terminating two-party or multiparty sessions consisting of one or several media streams. A mobile device registers its IP address with a SIP registrar server within an IMS core by generating and sending a SIP request message. Once registered, a mobile device may subsequently establish multimedia sessions via the IMS core.

An IMS client (or IMS stack) software component on a mobile device allows one or more applications on the mobile device to register for various application services that are available on the IMS network, such as Voice over LTE (VoLTE), Rich Communication Services (RCS), Short Message Service over Internet Protocol (SMS over IP), and Presence. If the registration is successful, the mobile device application may then take advantage of the functionality offered by the application service to which it is registered. If the registration is unsuccessful, however, then the application will be unable to take advantage of the offered functionality.

In mobile telecommunications networks, such as IMS networks, operators use call detail records (CDRs) to identify and troubleshoot various problems in the network. For example, a CDR often provides valuable information that operators use to determine a root cause of one or more dropped calls, such as the particular base station that is associated with one or more mobile devices participating in a dropped call. In a typical IMS network, CDRs are generated by a telephony application server (TAS) that is located within the IMS network and logs the identity of the base station associated with the mobile device in a CDR. Thereafter, if the mobile device places or receives a call that is subsequently dropped, a network operator may check the CDR to learn the identity of the associated base station for troubleshooting purposes. If, however, the mobile device moves from the initial base station to a new base station—a process known as "handover"—then the IMS network traditionally has no knowledge of the move. As a result, the TAS is unable to update an associated CDR to accurately reflect the base station to which the mobile device is connected. Unfortunately, this lack of visibility within the IMS network poses a significant disadvantage from a network troubleshooting perspective. In particular, because CDRs are not updated after handover occurs, a network operator has no way of knowing which cellular cite a mobile device was connected to if a call is dropped after a handover occurs. In these instances, a faulty or otherwise suboptimal base station may go undetected and remain in service for an extended period of time, resulting in poor network performance, increased customer frustration, and increased difficulty and expense in troubleshooting problems in the telecommunications network. These and other problems exist with prior art systems.

DETAILED DESCRIPTION

Figure 1:
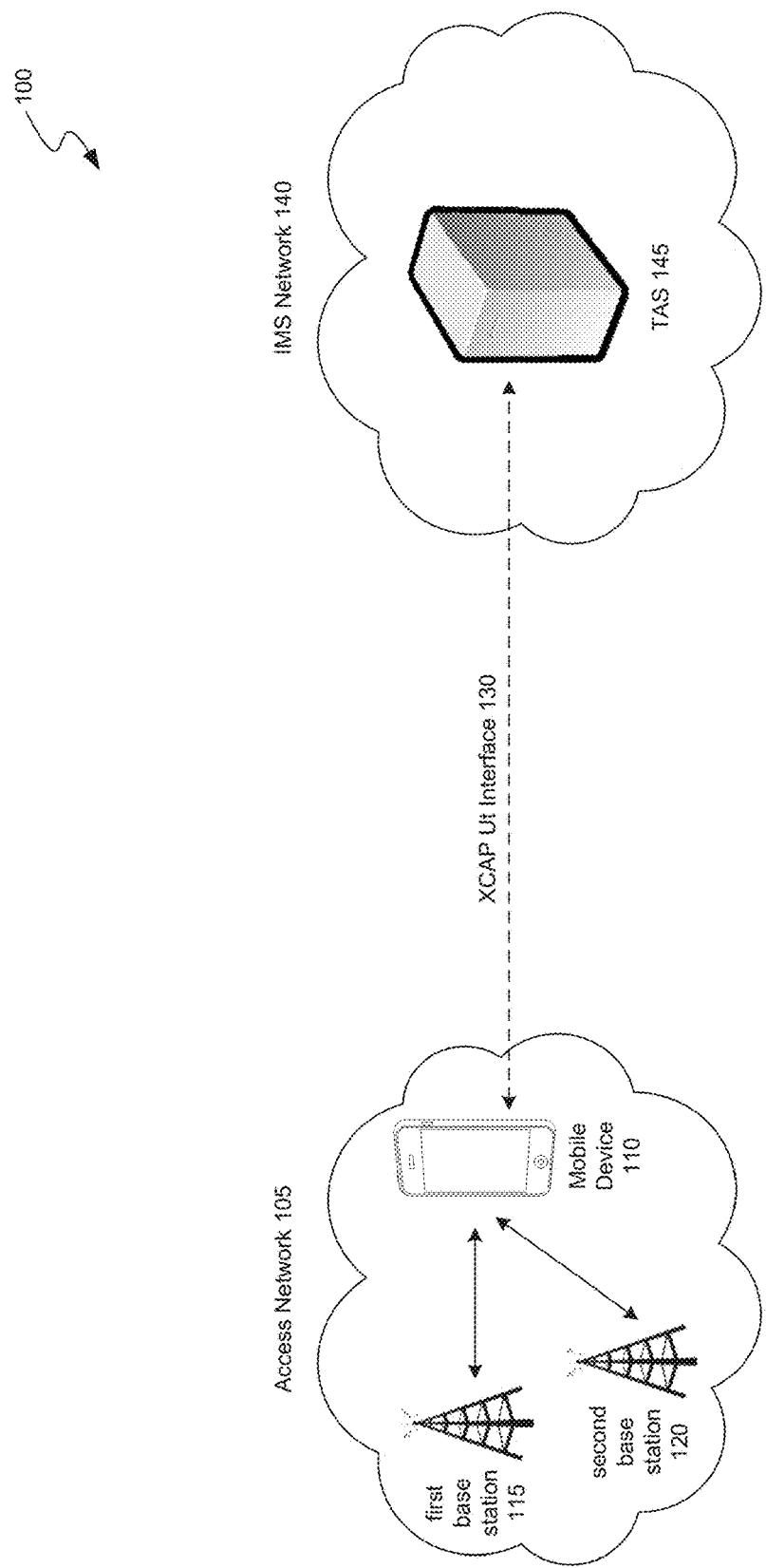
FIG. 1 is a diagram of a representative environment in which the disclosed system to communicate mobility events in an IMS network may operate.

The disclosed system provides a facility to communicate to an Internet Protocol Multimedia Subsystem (IMS) network an indication of mobility events occurring in a telecommunications access network. The system is adapted to operate in various types of telecommunications access networks, including second-generation wireless telephone technology (2G) networks, third-generation wireless telephone technology (3G) networks, fourth-generation wireless telephone technology (4G) networks, and long-term evolution (LTE) networks. The system is adapted to transmit mobility information from a mobile device to a component in an IMS network, such as a telephone application server (TAS) via an Extensible Markup Language Configuration Access Protocol (XCAP) Ut interface. To provide the functionality disclosed herein, the system makes use of various industry standards, including 3rd Generation Partnership Project (3GPP) TS 24.423, TS 24.611, TS 24.604, TS 24.607, TS 24.608, TS 24.615, TS 24.623, TS 33.222, and TS 36.423; Internet Engineering Task Force (IETF) RFC 4825 and RFC 7231; and Groupe Spéciale Mobile Association (GSMA) IR.92, all of which are herein incorporated by reference in their entirety.

In the disclosed system, a mobile device connects to a first base station (also known as an eNodeB, cellular site, base station, or base transceiver station (BTS)) and registers on an IMS network. The IMS network subsequently receives a first identifier that uniquely identifies the base station to which the mobile device is connected. Thereafter, a component in the IMS network, such as a telephone application server (TAS), stores the first identifier. In addition, the TAS creates or modifies a call detail record (CDR) to indicate that the mobile phone is connected to the base station. After the mobile device travels into a different geographical area and passes servicing of a call from the first base station to a second base station—a process known as "handover"—the mobile device transmits to the IMS network a second identifier that uniquely identifies the second base station. For example, a user of the mobile device may initiate or receive a telephone call while the mobile device is connected to the first base station. While the telephone call is in progress, the user may move into a different geographical area (e.g., if the user and mobile device are located inside of a moving vehicle) that is served by the second base station, thereby triggering a handover of the mobile device from the first base station to the second base station. A person of ordinary skill in the art will appreciate that handover may occur while the telephone call is in progress, or while there is no active telephone call. In an embodiment, the mobile device uses an XCAP Ut interface to transmit the identifier of the second base station to the TAS within the IMS network via an HTTP PUT request. In another embodiment, the mobile device transmits the identifier of the second base station to the TAS within the IMS network via an HTTP POST request. After receiving the second identifier, the TAS stores the received second identifier and modifies a CDR to reflect that the mobile device is connected to the second base station. In an embodiment, the TAS first compares the received second identifier to the stored first identifier, and then modifies the CDR only if the received second identifier and the stored first identifier do not match.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a diagram of a representative environment 100 in which the disclosed system to communicate mobility events in an IMS network may operate. In the environment 100, access network 105 includes mobile device 110, a first base station 115 and a second base station 120. The environment 100 also includes IMS network 140, which includes TAS 145. As explained in more detail herein, mobile device 110 may communicate mobility events (such as handover) to TAS 145 via XCAP Ut interface 130. Access network 105 may be any telecommunications network capable of connecting a mobile device to a telecommunications provider. Mobile device 110 may be virtually any device for communicating over a wireless network. Such devices include application servers or mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, infrared devices, handheld computers, laptop computers, wearable computers, tablet computers, pagers, integrated devices combining one or more of the preceding devices, and/or the like.

Mobile device 110 may connect to a telecommunications network via a trusted radio access network (RAN) or an untrusted RAN. A single mobile device may be capable of using one or both types of RANs. The RANs may use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like.

Figure 2:
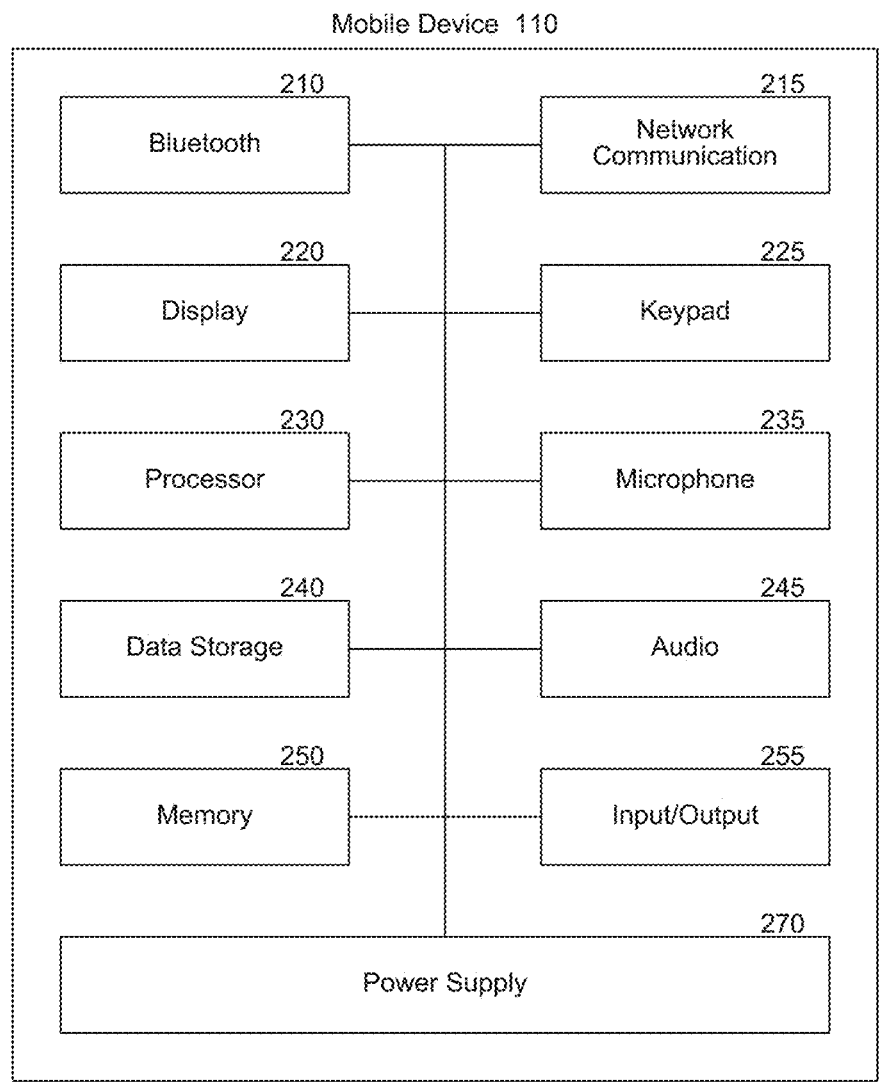
FIG. 2 is a block diagram of a representative mobile device that may transmit a notification of a mobility event to an IMS network in accordance with embodiments herein.

FIG. 2 is a block diagram of a representative mobile device 110 that may transmit a notification of a mobility event to an IMS network in accordance with embodiments herein. Mobile device 110 typically includes a processor 230 for executing processing instructions, a data storage medium component 240 (e.g., hard drive, flash memory, memory card, etc.), volatile memory and/or nonvolatile memory 250, a power supply 270, one or more network interfaces (e.g., Bluetooth Interface 210; and Network Communication Interface 215, which enables the mobile phone to communicate by transmitting and receiving wireless signals using licensed, semi-licensed or unlicensed spectrum over a telecommunications network), an audio interface 245, a display 220, a keypad or keyboard 225, a microphone 235, and other input and/or output interfaces 255. The various components of the mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more SIP or Diameter protocol clients capable of generating, transmitting and interpreting syntactically correct SIP or Diameter protocol messages. SIP clients permit the mobile device to register with and communicate via the IMS network.

Figure 3:
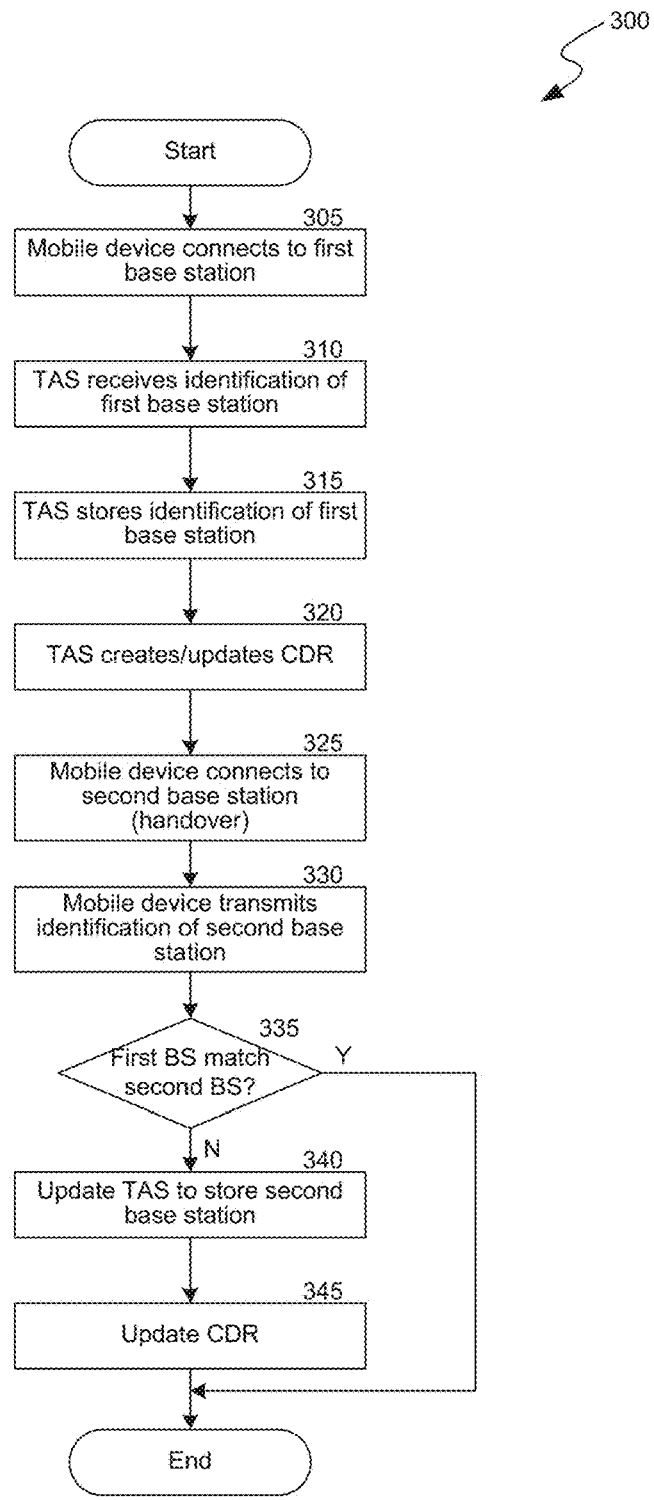
FIG. 3 is a call flow diagram showing a procedure for notifying an IMS network of a mobility event in an access network in accordance with embodiments herein.

FIG. 3 is a call flow diagram 300 showing a procedure for notifying an IMS network of a mobility event in an access network, such as an LTE network, in accordance with embodiments herein. At step 305, mobile device 110 connects to a first base station. A base station is hardware such as an eNodeB or BTS that is connected to a mobile phone network and enables wireless communication between a mobile device and a mobile phone network. At step 310, Telephony Application Server (TAS) 145 receives an identification of the first base station to which mobile device 110 is connected. In one embodiment, the IMS network receives the first identifier during call establishment (e.g., from an SIP INVITE) when the mobile device sends or receives a call. In some embodiments, a Cell Global Identity (CGI) is received that uniquely identifies the first base station. At step 315, IMS network 140 stores the identity of the first base station. In an embodiment, the identity of the first base station is stored in TAS 145, which resides within IMS network 140. TAS 140 is an IMS network component that provides various functionality within the IMS network, including without limitation call forwarding, voicemail, unified messaging, and video calling functions. TAS 140 is also capable of creating, modifying, and/or reporting a Call Detail Record (CDR), as described in more detail herein.

At step 320, TAS 145 creates or updates a Call Detail Record (CDR) to indicate that mobile device 110 is connected to the first base station. A CDR documents details of a telephone call and includes information such as the phone number of the call originator and call recipient, the date and time of a call, a call duration, an identification of the network component generating or modifying the CDR (e.g., a unique identifier of the TAS), a unique string that identifies the CDR itself, a call result (e.g., whether the call was accepted, terminated, dropped, blocked, etc.), routing information associated with a call, a call type (e.g., voice, SMS, MMS, etc.), and fault conditions. A telephone network operator may use information contained in a CDR to assist in troubleshooting network equipment or user equipment, generating telephone bills, tracking patterns in the telecommunications network or with respect to individual users or groups of users, and establishing the location of an individual user or group of users.

At step 325, the servicing of mobile device 110 is passed from first base station 115 to second base station 120. This procedure is known as handover. Handover typically occurs when a mobile device moves from a first geographic region served by a first base station to a different geographical region that is served by a different base station. In LTE environments, for example, handover may occur in accordance with the X2 Handover call flow procedure, as set forth in 3GPP TS 36.423, which is fully incorporated by reference herein.

At step 330, mobile device 110 transmits a notification to IMS network 140 to inform the network that a handover has occurred. In the disclosed embodiment, mobile device 110 transmits the notification to TAS 145 via Extensible Markup Language Configuration Access Protocol (XCAP) Ut interface 130. XCAP Ut interface 130 is a dedicated interface in IMS network 140 that is typically used to enable the modification and setting of Supplementary Services and Presence Information directly from a client (such as a mobile device) via Hypertext Transfer Protocol (HTTP) and XCAP protocols. XCAP Ut interface 130 is used for internetworking between an XCAP server (which may reside in a TAS) and an XCAP client (which may reside in a mobile device), and it allows users to read, write, and modify application configuration data. Additional details of XCAP Ut interface 130 are provided in GSMA IR.92 and 3GPP TS 24.623, TS 24.423 and 3GPP TS 33.222, all of which are herein incorporated by reference in their entirety. In an embodiment, mobile device 110 transmits an HTTP PUT message to IMS network 140 via XCAP Ut interface 130. The transmitted HTTP PUT message contains an identity (e.g., a CGI) of the second base station. For example, the identity of the second base station may be included under a "New field" called Value in the HTTP PUT request.

At step 335, in one embodiment TAS 145 internally checks the stored identity that was previously received, for example a CGI that was stored from the initial INVITE in step 315. If TAS 145 determines that the identity of the second base station matches the identity of the previously stored first base station (by using, for example, the "If-Match" field in the HTTP PUT message header), then TAS 140 will not update the stored first base station and will not update or modify the associated CDR. However, if TAS 145 determines at step 330 that the identity of the second base station does not match the identity of the previously stored first base station, then TAS 145 will proceed to step 340 and store an identification of the second base station. The system then proceeds to step 345, where TAS 145 updates the CDR to reflect the mobile device connection to the second base station. Although not depicted, other embodiments exist wherein the TAS transmits a POST request to IMS network 140 via XCAP Ut interface 130 in step 330. In such embodiments, TAS 145 may store an indication of the second base station without first determining whether the identification of the second base station matches the previously stored identification of the first base station (i.e., steps 335 and 340).

A network operator may subsequently access base station information stored in the CDR to assist in troubleshooting problems on the network. This information enables pegging of various network problems, including dropped calls (e.g., VoLTE audio mute). A network operator can therefore drive the right course of network optimization to the base station or coverage areas where resources are most urgently needed. For example, a network operator may use CDR data to derive an understanding of how a call was released (e.g., a normal release that occurs when a subscriber finishes a conversation and hangs up; or a dropped call that occurs when a call is prematurely terminated due to various network issues such as poor radio frequency (RF) coverage or problems in the transport or core network). By applying this data to a group of bulk calls, a network operator may deduce a drop call rate (DCR). The operator then breaks down DCR key performance indicators (KPI) by cell site, market, and/or region (or other category) to determine where network quality is impacted. The operator then has the ability to drive required optimization actions to the determined impacted areas.

Remarks

The Figures and above description provide a brief, general description of a suitable environment in which the invention can be implemented. Although not required, aspects of the invention may be implemented in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, handheld devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device or single computer, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices. Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, certain aspects of the disclosed system be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

I claim:

1. A system adapted to tracking mobility events in a mobile telecommunications access network, the system comprising:
    a memory;
    a processor coupled to the memory, wherein the system is further configured to:
        receive, from a mobile device, a request to register to an IMS network;
        receive an identification of a first node to which the mobile device is connected,
            wherein the first node is a node is coupled to the IMS network and enables wireless communication between the mobile device and the mobile telecommunications access network;
        receive an identification of a second node to which the mobile device is connected,
            wherein the second node is a node is coupled to the IMS network and enables wireless communication between the mobile device and the mobile telecommunications access network;
            wherein the identification of the second node is received via a Hypertext Transfer Protocol (HTTP) request on an Extensible Markup Language Configuration Access Protocol (XCAP) Ut interface, and
            wherein the identification of the second node to which the mobile device is connected is received via a Hypertext Transfer Protocol (HTTP) PUT request or a HTTP POST request on the XCAP Ut interface; and
        create or modify, by the component within the IMS network, a call detail record to log an indication of the second node to which the mobile device is connected.

2. The system of claim 1, wherein the identification of the first node, the identification of the second node, or both are a cell global identifier (CGI), and wherein the identification of the first node is received by a telephony application server (TAS) as part of a SIP INVITE message.

3. The system of claim 1, wherein receiving the identification of the second node to which the mobile device is connected occurs during a call and as the mobile telecommunications access network makes a handover of the call from the first node to the second node.

4. The system of claim 1, wherein the receiving an identification of a second node occurs in response to a Long Term Evolution (LTE) X2 handover of the mobile device from the first node to the second node.

5. The system of claim 1, wherein the system is further configured to store the identification of the second node to which the mobile device is connected, wherein the storing occurs without first determining that the identification of the second node does not match a previously stored identification of the first node.

6. The system of claim 1, wherein the modifying of the call detail record occurs only in response to a determination that the identification of the second node does not match the stored identification of the first node.

7. A computer-implemented method to track mobility events in a mobile telecommunications access network, the method comprising:
   receiving, from a wireless mobile device, a request to register to an IMS network;
   receiving an identification of a first node to which the mobile device is connected,
      wherein the first node is coupled to the IMS network and enables wireless communication between the mobile device and the mobile telecommunications access network;
   receiving an identification of a second node to which the mobile device is connected,
      wherein the second node is coupled to the IMS network and enables wireless communication between the mobile device and the mobile telecommunications access network;
      wherein the identification of the second node is received via a Hypertext Transfer Protocol (HTTP) request on an Extensible Markup Language Configuration Access Protocol (XCAP) Ut interface, and
      wherein the identification of the second node to which the mobile device is connected is received via a Hypertext Transfer Protocol (HTTP) PUT request or a HTTP POST request on the XCAP Ut interface; and
   creating or modifying, by the component within the IMS network, a call detail record to log an indication of the second node to which the mobile device is connected.

8. The computer-implemented method of claim 7, wherein the identification of the first node, the identification of the second node, or both are a cell global identifier (CGI).

9. The computer-implemented method of claim 7, wherein receiving the identification of the second node to which the mobile device is connected occurs during a call and as the mobile telecommunications access network makes a handover of the call from the first node to the second node.

10. The computer-implemented method of claim 7, wherein the identification of the first node is received by a telephony application server (TAS) as part of a SIP INVITE message.

11. The computer-implemented method of claim 7, wherein the receiving an identification of a second node occurs in response to a Long Term Evolution (LTE) X2 handover of the mobile device from the first node to the second node.

12. The computer-implemented method of claim 7 further comprises storing the identification of the second node to which the mobile device is connected, wherein the storing occurs without first determining that the identification of the second node does not match a previously stored identification of the first node.

13. The computer-implemented method of claim 7, wherein the modifying of the call detail record occurs only in response to a determination that the identification of the second node does not match the stored identification of the first node.

14. A non-transitory computer-readable medium storing instructions that, when executed by a processor in an Internet Protocol Multimedia Subsystem (IMS) network, cause the network to execute a method to track mobility events in a mobile telecommunications access network, the method comprising:
   receiving, from a mobile device, a request to register to an IMS network;
   receiving an identification of a first node to which the mobile device is connected,
      wherein the first node is coupled to the IMS network and enables wireless communication between the mobile device and the mobile telecommunications access network;
   receiving an identification of a second node to which the mobile device is connected,
      wherein the second node is coupled to the IMS network and enables wireless communication between the mobile device and the mobile telecommunications access network;
      wherein the identification of the second node is received via a Hypertext Transfer Protocol (HTTP) request on an Extensible Markup Language Configuration Access Protocol (XCAP) Ut interface; and
   creating or modifying, by the component within the IMS network, a call detail record to log an indication of the second node to which the mobile device is connected.

15. The non-transitory computer-readable medium of claim 14, wherein the identification of the first node, the identification of the second node, or both are a cell global identifier (CGI).

16. The non-transitory computer-readable medium of claim 14, wherein receiving the identification of the second node to which the mobile device is connected occurs during a call and as the mobile telecommunications access network makes a handover of the call from the first node to the second node.

17. The non-transitory computer-readable medium of claim 14, wherein the identification of the first node is received by a telephony application server (TAS) as part of a SIP INVITE message.

18. The non-transitory computer-readable medium of claim 14, wherein the receiving an identification of a second node occurs in response to a Long Term Evolution (LTE) X2 handover of the mobile device from the first node to the second node.

19. The non-transitory computer-readable medium of claim 14, wherein the method further comprises storing the identification of the second node to which the mobile device is connected, wherein the storing occurs without first determining that the identification of the second node does not match a previously stored identification of the first node.

20. The non-transitory computer-readable medium of claim 14, wherein the modifying of the call detail record occurs only in response to a determination that the identification of the second node does not match the stored identification of the first node.

* * * * *